United States Patent
Tisserand et al.

(10) Patent No.: US 9,225,277 B2
(45) Date of Patent: Dec. 29, 2015

(54) METHOD AND SYSTEM FOR CONTROLLING A MOTOR VEHICLE ALTERNATOR, AND MOTOR VEHICLE ALTERNATOR INCLUDING SUCH A SYSTEM

(71) Applicant: VALEO EQUIPEMENTS ELECTRIQUES MOTEUR, Creteil (FR)

(72) Inventors: Pierre Tisserand, Limeil Brevannes (FR); Pierre Chassard, Creteil (FR); Jean-Guillame Aubin, L'Huisserie (FR)

(73) Assignee: Valeo Equipements Electriques Moteur, Creteil (FR)

( * ) Notice: Subject to any disclaimer, the term of this patent is extended or adjusted under 35 U.S.C. 154(b) by 5 days.

(21) Appl. No.: 14/363,392

(22) PCT Filed: Nov. 30, 2012

(86) PCT No.: PCT/FR2012/052759
§ 371 (c)(1),
(2) Date: Jun. 6, 2014

(87) PCT Pub. No.: WO2013/083902
PCT Pub. Date: Jun. 13, 2013

(65) Prior Publication Data
US 2014/0340055 A1  Nov. 20, 2014

(30) Foreign Application Priority Data
Dec. 8, 2011  (FR) ...................................... 11 61313

(51) Int. Cl.
*H02P 9/48* (2006.01)
*H02P 9/30* (2006.01)
*H02P 9/10* (2006.01)

(52) U.S. Cl.
CPC .. *H02P 9/48* (2013.01); *H02P 9/10* (2013.01); *H02P 9/305* (2013.01)

(58) Field of Classification Search
CPC ............. H02P 9/48; H02P 9/10; H02P 9/305; H02P 9/102; H02P 9/105; H02P 9/107
See application file for complete search history.

(56) References Cited

U.S. PATENT DOCUMENTS

| 2003/0007368 | A1  | 1/2003 | Kawazoe et al. |
| 2005/0140142 | A1* | 6/2005 | Welches ..................... H02J 3/30 290/41 |
| 2008/0116858 | A1* | 5/2008 | Steiner ..................... H02J 7/242 322/25 |
| 2009/0167256 | A1* | 7/2009 | Maddali ..................... H02P 9/10 322/25 |

(Continued)

FOREIGN PATENT DOCUMENTS

| JP | H09121598 | 5/1997 |
| JP | 2010119248 | 5/2010 |

*Primary Examiner* — Tulsidas C Patel
*Assistant Examiner* — Viet Nguyen
(74) *Attorney, Agent, or Firm* — Berenato & White, LLC

(57) ABSTRACT

A method for controlling a motor vehicle alternator, in which an error value, resulting from the comparison between the voltage produced by the alternator and a set value, is processed in a filtering means by applying a transfer function, which determines a gain to be associated with the error value on the basis of the rotational frequency of the alternator, in order to control the adjustment of the field current allowed by the alternator. The transfer function of the filtering means is modified on the basis of the rotational speed of the alternator by attenuating the gain over a given frequency range when the rotational speed decreases.

14 Claims, 4 Drawing Sheets

(56) References Cited

U.S. PATENT DOCUMENTS

| | | | | |
|---|---|---|---|---|
| 2009/0175061 A1* | 7/2009 | Rajne | ................ | H02M 7/53871 363/90 |
| 2009/0250943 A1* | 10/2009 | Larsen | .................... | H02P 9/102 290/40 B |
| 2010/0053825 A1* | 3/2010 | Tisserand | ................ | H02J 7/163 361/21 |
| 2012/0176100 A1* | 7/2012 | Tisserand | .................. | H02P 6/14 322/24 |

* cited by examiner

METHOD AND SYSTEM FOR CONTROLLING A MOTOR VEHICLE ALTERNATOR, AND MOTOR VEHICLE ALTERNATOR INCLUDING SUCH A SYSTEM

CROSS-REFERENCE TO RELATED APPLICATIONS AND CLAIM TO PRIORITY

This application is a national stage application of International Application No. PCT/FR2012/052759 filed Nov. 30, 2012, which claims priority to French Patent Application No. 1161313 filed Dec. 8, 2011, of which the disclosures are incorporated herein by reference and to which priority is claimed.

FIELD OF THE INVENTION

The present invention relates to a method for regulating an alternator which is designed to be coupled to a thermal engine of a motor vehicle. The invention also relates to a system comprising all the means necessary for implementation of this method, as well as the alternator equipped with this system.

BACKGROUND OF THE INVENTION

In the field of motor vehicles, the purpose of an alternator is to generate a direct voltage for the supply of the on-board electrical network, and to maintain it at a predetermined set value, for the electrical supply to the vehicle equipment and to a battery.

The alternator comprises a stator which is secured to the structure of the vehicle, and surrounds a rotor supported by a shaft which is rotated by the thermal engine of the vehicle by means of an alternator belt. The alternator makes it possible to transform a movement of rotation of the rotor into an electric current induced in the stator windings. Downstream from the alternator, an alternating/direct converter, which for example is reversible, then makes it possible to generate a direct voltage for the supply to the on-board electrical network.

Upstream from the alternator, a regulating system, known as the "regulator", which is generally integrated in the alternator, is used to maintain a stable voltage at the output from the alternator, independently from the speed of rotation of the engine or the electric consumption of the vehicle's equipment. For this purpose it controls the production of an excitation current supplied to the inductor rotor, in order to control the intensity of the associated magnetic field, and thus the voltage induced by this magnetic field and the current produced at the output from the alternator, which, by means of the battery and charges, determines the voltage of the on-board network.

Nowadays, parts manufacturers in the motor vehicle industry have developed very high-performance alternators by implementing digital techniques. Regulating systems are known wherein the voltage produced at the output from the alternator is sampled and digitally converted, the digital values obtained then being compared continuously with a set value, for example 14 V. After filtering, the result of this comparison is used to quantify the intensity of the excitation current to be conveyed to the alternator, in order to maintain the output voltage at the set value.

As previously described, the alternator is coupled mechanically to the thermal engine. However, in thermal engines, a phenomenon known as acyclism occurs, caused by the explosions in the cylinders of the thermal engine, which give rise to accelerations and decelerations around the mean speed. This takes the form of non-uniform speeds of rotation of the engine which affect the alternator.

The curve which is representative of the current output according to the speed of rotation for a standard alternator can, with an approximate approach, be modeled simply by two straight lines, i.e. a first straight line with a steep gradient which for low speeds describes the beginning of increase of the current, and a second straight line with a slight gradient, for higher speeds. When the speed of rotation of the alternator is higher than the speed of rotation corresponding to the joining point of the two straight lines (and which is known as the bottom-of-curve speed $V_{bc}$), the acyclism gives rise to little current variation, and therefore to little variation of the voltage produced by the alternator (FIG. 1). On the other hand at a very low speed, when the speed of rotation of the alternator is lower than this bottom-of-curve speed (corresponding to the joining point of the two straight lines), the acyclism oscillations give rise to greater fluctuation of the current output from the alternator (FIG. 2), which involves substantial variations of the voltage at the level of the battery.

In parallel, mainly for reasons of energy-saving, certain motor vehicle manufacturers have been induced to lower the idling speed of the thermal engines which equip their vehicles, to speeds of rotation lower than 800 rpm. Since the alternator is coupled mechanically to the thermal engine, this means that the alternator has a speed of rotation which decreases proportionally during these idling phases. In these situations, the case illustrated by FIG. 2 exists, in which the phenomenon of acyclism gives rise to strong variations of the current output by the alternator, and consequently to strong variations of the on-board network voltage. These strong voltage variations are taken into account by the regulator, which tends to oppose this effect by means of regulation, with the result of making certain functions inoperative.

SUMMARY OF THE INVENTION

Consequently, the object of the present invention is to eliminate this disadvantage by proposing a method for regulation which makes it possible to overcome these problems of variation of the current output by the alternator of a motor vehicle, without however going against the trend according to which the idling speeds of the vehicles are increasingly low.

Specifically, its objective is a method for regulating a motor vehicle alternator which is designed to be coupled to a thermal engine of the vehicle, and can produce a supply voltage of an on-board network of this vehicle. The supply voltage produced is compared in a control loop with a set value, in order to determine the value of an excitation current to be circulated in the alternator for the production of a voltage equivalent to the said set value. According to the method of the invention, the error value derived from the comparison between the supply voltage and the set value is processed in a filter, the original transfer function of the filter is modified according to the speed of rotation of the alternator, by attenuating the gain in a given frequency range when this speed of rotation decreases, and the gain of the transfer function is determined for a given frequency between a maximum threshold corresponding to the gain of the original transfer function, and a minimum threshold determined for preservation of the stability of the alternator, with the maximum threshold being preserved when the speed of rotation of the alternator is equal to, or higher than, a first given limit speed, and with the minimum threshold being selected when the speed of rotation of the alternator is equal to, or lower than, a second given limit speed.

Thus, according to the invention, it is possible to preserve the same quality of filtering of the differences between the required voltage at the output from the alternator, and the voltage which is actually supplied when the engine is rotating at full speed, and it is possible to provide suitable filtering for these differences when the engine is rotating at idling speed. This therefore ensures both performance with dynamics suitable for high speed, and modification of the performance at low speed, in order to not to take into account voltage variations which are amplified in conditions of acyclism.

According to a characteristic of the invention, the transfer function is attenuated for frequency values corresponding to idling speeds of the thermal engine. Thus, error filtering modifications are targeted for potential cases of acyclism.

According to characteristics of the invention, a plurality of profiles for the transfer function are recorded, and the profile to be applied to the transfer function in progress is selected automatically, according to the value at which the speed of rotation of the alternator is placed, from amongst a plurality of ranges of predefined values. Switching devices are provided in order to go from one transfer function profile to another.

According to a characteristic of the invention, there is determination of a first frequency corresponding to a controlled cut-off frequency, from which the gain is attenuated, and beyond which the transfer function modified according to the speed of rotation of the alternator has a first part identical to the original transfer function, and there is determination of a second frequency, higher than the first frequency, from which the acyclism gain is stable up to a cut-off frequency, the gain being attenuated regularly between the first and the second frequency. The second frequency can be the same when there is transition from one predetermined profile to another, in order to adapt the transfer function according to the speed of rotation.

According to a particular embodiment, the different voltages are processed digitally, and the transfer function is modified digitally. It is thus possible to modify the transfer functions and the quality of the filtering without needing to change the equipment.

The invention also relates to a system for regulating an alternator which is designed to be coupled to a thermal engine of a motor vehicle, and comprising all the means necessary for implementation of the above-described method. In particular, the regulating system comprises a loop for control of the supply voltage of an on-board network of the vehicle at a set value, wherein a comparator is designed to address as output an error value which depends on the comparison of the voltage produced by the alternator and the set value. It also advantageously comprises acquisition means which are sensitive to the speed of rotation of the alternator, and means for filtering of the said error value at the output from the comparator, the said filtering means having a transfer function which can be modified according to the value of the said speed obtained from the said acquisition means.

The invention also relates to a motor vehicle alternator associated with a regulating system with the characteristics specified above.

BRIEF DESCRIPTION OF THE DRAWINGS

The invention will now be described more completely within the context of preferred characteristics and their advantages, with reference to the figures of the appended drawings which illustrate them, and in which.

DETAILED DESCRIPTION

Figure 1:
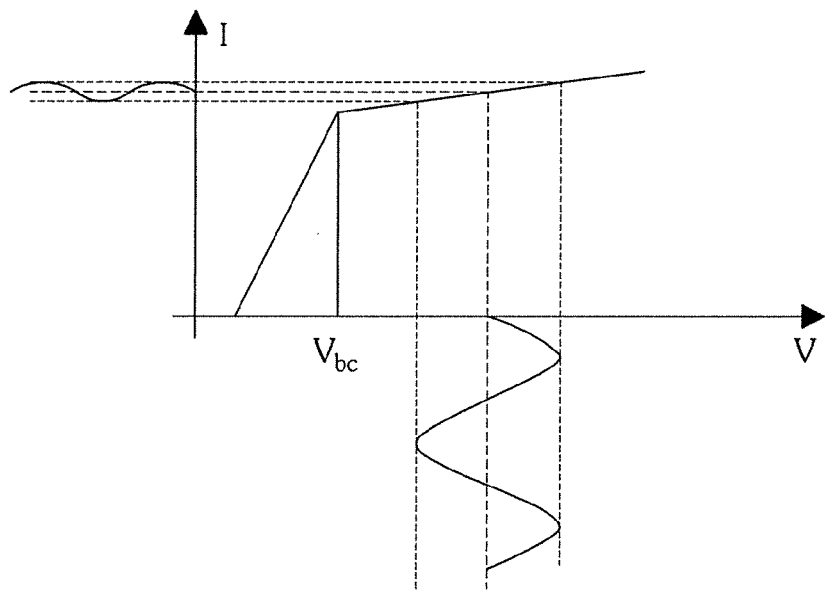
FIGS. 1 and 2 are schematic representations of curves characteristic of the current output by a motor vehicle alternator according to its speed of rotation, which show the oscillation of the current according to the acyclism oscillations, for two different speeds of rotation.
Figure 2:
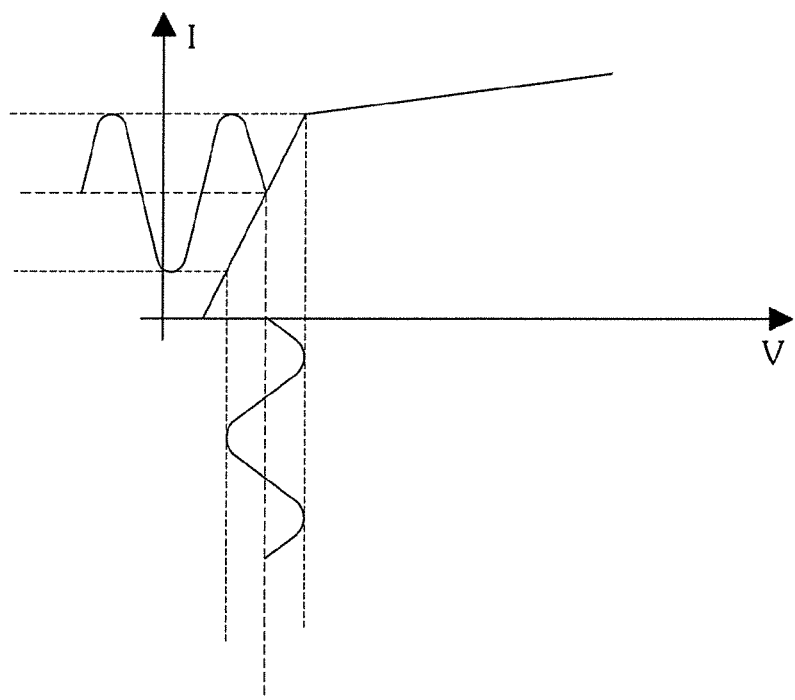
Figure 3:
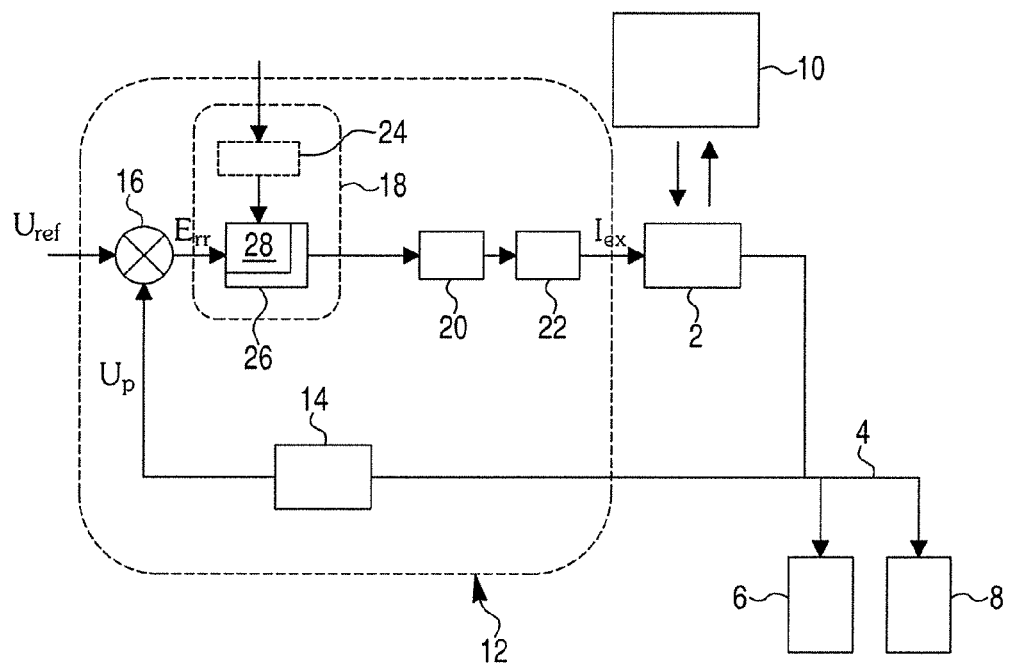
FIG. 3 is a functional diagram of the alternator and of the different components of the vehicle, as well as of the associated regulating system according to the invention.

FIG. 3 represents a general architecture of a supply by an alternator 2 to an on-board network 4 of a motor vehicle, to which there are connected a battery 6 and electrical equipment 8. The alternator is coupled mechanically to a thermal engine 10 which is subjected as previously described to acyclism phenomena which are transmitted to the alternator.

The objective is the production of a constant voltage at the output from the alternator for good supply to the on-board network, and this voltage produced $U_p$ is regulated by means of a regulating system which is associated with the alternator, and forms a control loop 12.

The regulating system comprises in succession along the loop a digital acquisition block 14, a digital comparator 16, a filtering block 18, an excitation signal generator 20, and a power switch 22.

The digital acquisition block comprises an analogue/digital converter and a digital conditioning module, such as to make it possible to exploit digitally the voltages measured at the output from the alternator. The supply voltage which is really produced by the alternator is taken for example from the terminals of the battery, and is then sampled in order to be sent to the digital comparator 16, which proceeds with regular comparisons of this value rendered digital, with a stable reference voltage $U_{ref}$ which is conventionally equal to 14 V.

A specific frequency of rotation of the alternator results in an error value $E_{rr}$ between the signal sampled and the set value formed by the reference voltage.

It is according to this error value thus obtained by comparison that the excitation signal generator supplies signals, with the cyclical ratio of the signals varying according to the error value.

In a known manner, the generator is of the pulse width modulation type. The excitation signals supplied are designed for a power switch for control of an excitation current $I_{ex}$ which can circulate in an excitation winding of the alternator, in order to modify the voltage produced by the alternator, and restore it to the reference voltage.

Before being sent to the signal generator, the error value goes into the filter block disposed at the output from the comparator, between the latter and the signal generator.

A description in greater detail will now be provided of the filter block. It comprises means 24 for acquisition of the speed of rotation of the alternator and filtering means 26, as well as control means 28 which are integrated in the filtering means, in order to allocate to them a specific transfer function.

The means for acquisition are advantageously already used elsewhere in the vehicle, and the information relating to the speed of rotation of the alternator is used without resorting to the installation of a specific sensor. It will be possible for example to utilise means used for measurement of the frequencies of the phase of rotation of the alternator, and send the corresponding information directly to the control means 28.

Figure 4:
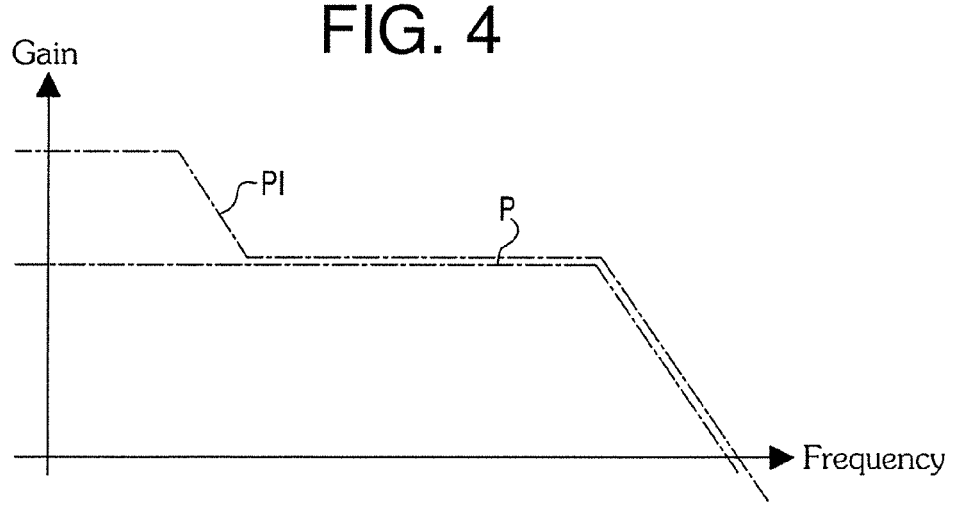
FIG. 4 represents curves which are representative of the transfer function of two types of filter designed to be used in the regulating system according to the invention.

FIG. 4 represents the standard characteristics of a proportional filter P and an integral filter PI which can be selected by way of example in order to form the filtering means 26. These characteristics represent the gain to be associated with the filtered error value, according to the frequency of rotation of the alternator. In the figures illustrated subsequently, reference will be made to the characteristics of a proportional filter.

Figure 5:
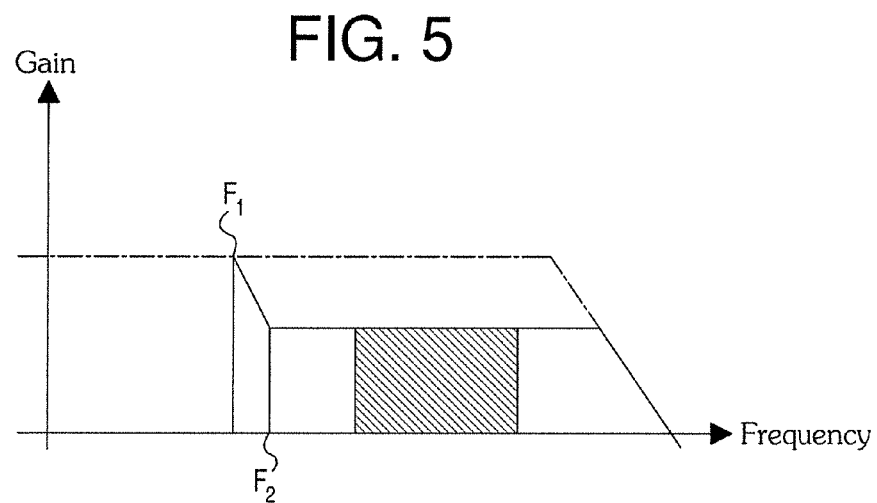
FIGS. 5 and 6 are curves representative of the transfer function, for a particular type of filter, which curves are modified according to the invention in accordance with the speed of rotation of the alternator.

According to the invention, as illustrated in FIG. 5, the control means 28 are designed to modify the transfer function of the filtering means 26 according to the information relating to the speed of rotation of the alternator, received from the means for acquisition 24. A plurality of transfer function profiles are parameterised in the control means, which select automatically the profile to be applied to the transfer function of the filtering means, according to the speed of rotation of the alternator. Switching devices are provided in order to go from one transfer function to another, according to instructions given by the control means.

Figure 6:
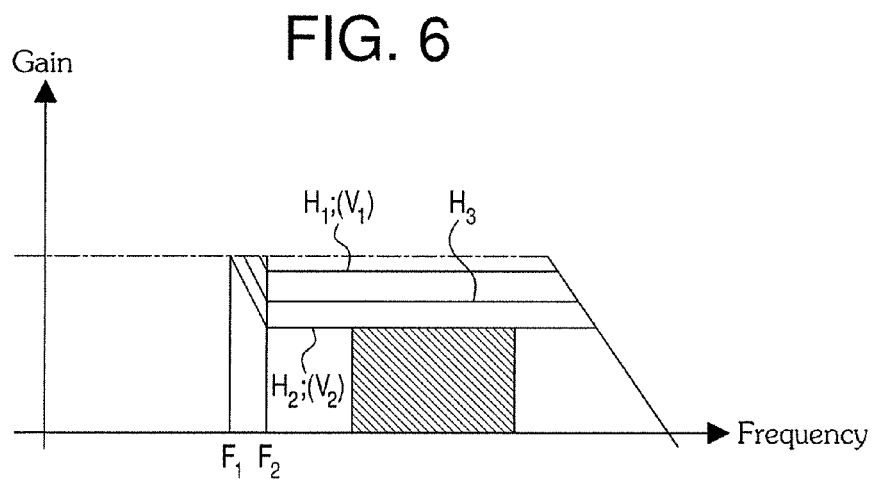

Thus, according to the speed of rotation of the alternator, it is proposed to adapt the gain to be associated with the frequential acyclism area. As can be seen in FIG. 6, which shows three distinct transfer functions, the transfer function, i.e. the curve representative of the gain, is selected from amongst an upper curve $H_1$ corresponding to a maximum gain value, and a lower curve $H_2$.

Thus, for a given frequency, the transfer function gain is determined from amongst a maximum threshold, corresponding to the gain of the original transfer function of the filtering means selected, and a minimum threshold. The minimum threshold is determined in order to preserve the stability of the system, in other words this minimum amplification must not generate an oscillating system.

The maximum threshold is preserved when the speed of rotation of the alternator is equal to, or higher than, a first given limit speed $V_1$, and the minimum threshold is selected by the control means when the speed of rotation of the alternator is equal to, or lower than, a second given limit speed $V_2$. The first given limit speed can be selected for example as being equal to the bottom-of-curve speed $V_{bc}$ previously described, which is the characteristic value of the curve representative of the current output according to the speed of rotation of the alternator.

As represented, the transfer function can assume the form of an intermediate curve $H_3$, and this is obtained by adding to the parameters of the control means threshold speed values, such as to define a plurality of speed ranges, so that if the speed of rotation acquired comes within one of these ranges, the transfer function of the acyclism area is adapted, and can assume the form of this intermediate curve.

It has been found that the acyclism is generally visible at low speeds of rotation of the alternator, in frequency areas of between 20 and 30 Hz, represented in FIGS. 5 and 6 by a hatched area. According to the invention, the transfer function which is selected automatically by the control means, according to the information relating to the speed of rotation, comprises a pass band which is attenuated specially for frequencies at which the acyclism occurs, at the low speeds of rotation of the alternator.

As illustrated in FIGS. 5 to 7, the transfer function which is designed for a specific speed has a controlled cut-off frequency $F_1$, from which the gain is attenuated up to a frequency $F_2$ at which the acyclism gain is stable, with the frequency $F_2$ being greater than the cut-off frequency $F_1$.

Figure 7A:
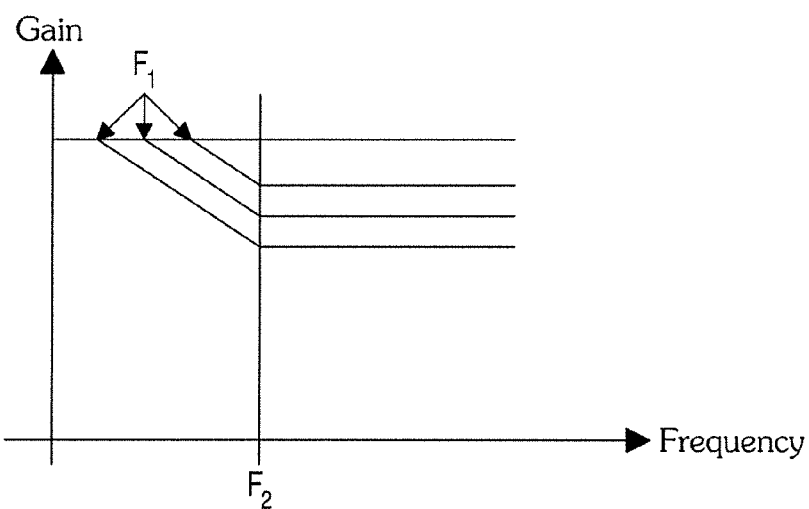
FIGS. 7a and 7b are schematic representations of two embodiments of the invention, which differ in that the modifications of the transfer function are carried out at a constant frequency (FIG. 7a), or are not carried out at constant frequency (FIG. 7b).
Figure 7B:
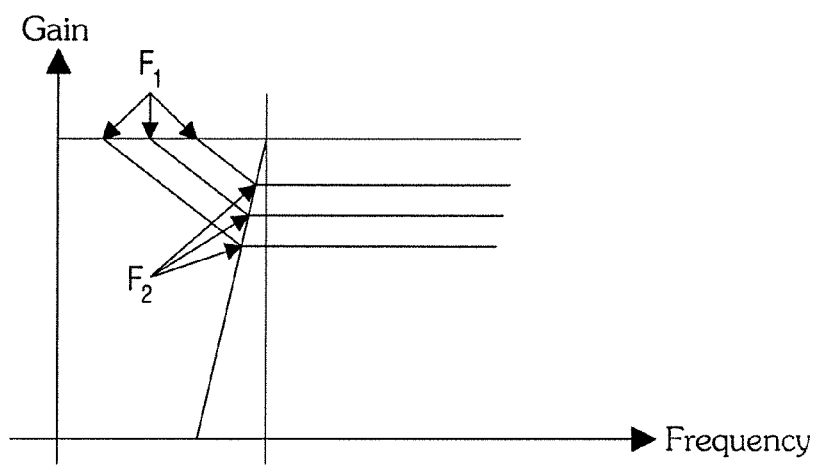

Persons skilled in the art will know to select the frequency $F_2$ according to the applications for cars and alternators. FIGS. 7a and 7b show two embodiments for making this frequency $F_2$, at which the acyclism gain is stable, develop from one transfer function to another according to the speeds. In a first embodiment, the frequency $F_2$ has a fixed value. In a second embodiment, the frequency $F_2$ changes according to the gain with which the filter is to be provided in the attenuated area, in order to compensate for the loss of phase margin in critical cases of stability of the application on the vehicle.

The foregoing description explains clearly how the invention makes it possible to achieve the objectives which it has established. In particular, it has the advantage of making the system more stable at a low speed, since the regulating system does not take into account excessive voltage variations during idling, and in particular for a frequency of between 20 and 30 Hz. It is ensured that when the alternator is rotating a low speed, the static gain of the filter and the attenuation of the errors are decreased. This therefore prevents excessively great regulating jumps which can generate a demand for an increase in the excitation current by the regulating system, and a rapid increase in the torque collected by the alternator from the thermal engine, which is then liable to stall, in particular when the engine is idling. The application according to the invention is particularly advantageous within the context of use of a progressive load function (known as "LRC", the acronym for the definition "Load Response Control"), which permits only progressive increases of the excitation signal from the initial value to the value determined by the regulating system, in order to prevent this regulation from acting to the detriment of the torque of the engine, which is therefore not subjected to strong variations in the idling speeds of the vehicle.

The invention claimed is:

1. A method for regulating a motor vehicle alternator (2) designed to be coupled to a thermal engine (10) of said vehicle for producing a supply voltage for an on-board network (4) of said vehicle, said method comprising the step of comparing said voltage (Up) produced by said alternator with a set value (Uref) in a control loop (12) in order to determine the value of an excitation current (Iex) to be circulated in said alternator for the production of a voltage equivalent to said set value, wherein an error value (Err) derived from the comparison between said voltage produced and said set value is processed in a filtering means (26) by applying a transfer function which determines a gain to be associated with said error value according to a speed of rotation of the alternator in order to control the regulation of the excitation current allowed by said alternator, wherein said transfer function of said filtering means is modified according to said speed of rotation of said alternator by attenuating said gain in a given frequency range when said speed of rotation decreases, and wherein said gain of said transfer function is determined for a given frequency between a maximum threshold (H1) corresponding to the gain of said original transfer function, and a minimum threshold (H2) determined for preservation of stability said alternator, with said maximum threshold being preserved when said speed of rotation of said alternator is equal to, or higher than, a first given limit speed (V1), and with said minimum threshold being selected when said speed of rotation of said alternator is equal to, or lower than, a second given limit speed (V2).

2. The method according to claim 1, wherein said transfer function is attenuated for frequency values corresponding to low speeds of rotation of the alternator.

3. The method according to claim 2, wherein a plurality of profiles of said transfer function are predetermined, and wherein the profile to be applied to said transfer function in progress is selected automatically, according to the value at which said speed of rotation of said alternator is placed, from amongst a plurality of ranges of predefined values.

4. The method according to claim 2, wherein the different voltages are processed digitally, and wherein said transfer function is modified digitally.

5. The method according to claim 1, wherein a plurality of profiles of said transfer function are predetermined, and in that the profile to be applied to the transfer function in progress is selected automatically, according to the value at which said speed of rotation of said alternator is placed, from amongst a plurality of ranges of predefined values.

6. The method according to claim 5, wherein switching devices are provided in order to go from one transfer function profile to another.

7. The method according to claim 6, wherein there is determination of a first frequency corresponding to a controlled cut-off frequency (F1), from which said gain is attenuated, and beyond which said transfer function modified according to said speed of rotation of said alternator has a first part identical to the original transfer function, and wherein there is determination of a second frequency (F2), corresponding to a frequency from which the acyclism gain is stable up to a cut-off frequency, with said gain varying regularly between the first and said second frequency.

8. The method according to claim 6, wherein the different voltages are processed digitally, and wherein said transfer function is modified digitally.

9. The method according to claim 5, wherein there is determination of a first frequency corresponding to a controlled cut-off frequency (F1), from which said gain is attenuated, and beyond which said transfer function modified according to said speed of rotation of said alternator has a first part identical to said original transfer function, and wherein there is determination of a second frequency (F2), corresponding to a frequency from which said acyclism gain is stable up to a cut-off frequency, with said gain varying regularly between said first and said second frequency.

10. The method according to claim 9, wherein said second frequency (F2) is the same between one predetermined transfer function profile and another.

11. The method according to claim 10, wherein the different voltages are processed digitally, and wherein said transfer function is modified digitally.

12. The method according to claim 9, wherein the different voltages are processed digitally, and wherein said transfer function is modified digitally.

13. The method according to claim 5, wherein the different voltages are processed digitally, and wherein said transfer function is modified digitally.

14. The method according to claim 1, wherein the different voltages are processed digitally, and wherein said transfer function is modified digitally.

* * * * *